United States Patent
Jung et al.

(10) Patent No.: US 10,665,891 B2
(45) Date of Patent: May 26, 2020

(54) LITHIUM-SULFUR THERMAL BATTERY

(71) Applicant: J-INNOTECH CO., LTD, Asan-si (KR)

(72) Inventors: Yong Ju Jung, Yuseong-gu (KR); Hye Jeong Yang, Seosan-si (KR); Tae Hyeon Yang, Jung-gu (KR); Ji Hun Kang, Jeju-si (KR); Jin Kyeong Kang, Cheongju-si (KR); Jong Won Park, Gwangju-si (KR)

(73) Assignee: J-INNOTECH CO., LTD, Asan-si (KR)

( * ) Notice: Subject to any disclaimer, the term of this patent is extended or adjusted under 35 U.S.C. 154(b) by 213 days.

(21) Appl. No.: 15/770,654

(22) PCT Filed: Jan. 26, 2017

(86) PCT No.: PCT/KR2017/000953
§ 371 (c)(1),
(2) Date: Apr. 24, 2018

(87) PCT Pub. No.: WO2017/131464
PCT Pub. Date: Aug. 3, 2017

(65) Prior Publication Data
US 2018/0316043 A1    Nov. 1, 2018

(30) Foreign Application Priority Data
Jan. 28, 2016    (KR) ........................ 10-2016-0010882

(51) Int. Cl.
*H01M 6/36*    (2006.01)
*H01M 4/38*    (2006.01)
(Continued)

(52) U.S. Cl.
CPC ......... *H01M 10/052* (2013.01); *H01M 4/136* (2013.01); *H01M 4/38* (2013.01);
(Continued)

(58) Field of Classification Search
CPC ........... H01M 10/052; H01M 10/0565; H01M 10/655; H01M 2004/027; H01M 4/136;
(Continued)

(56) References Cited

U.S. PATENT DOCUMENTS 4,968,568 A    11/1990    Higley
7,462,424 B2 *    12/2008    Munshi ............... H01M 4/5835
                                                        429/231.8

(Continued)

FOREIGN PATENT DOCUMENTS

GB    1397767 A    *    6/1975    ............. H01M 6/36
GB    1507308 A    *    4/1978    ............. H01M 6/36

(Continued)

OTHER PUBLICATIONS

International Search Report issued in PCT/KR2017/000953 dated Apr. 28, 2017 (2 pages).

(Continued)

*Primary Examiner* — Basia A Ridley
*Assistant Examiner* — Heng M. Chan
(74) *Attorney, Agent, or Firm* — Osha Liang LLP

(57) ABSTRACT

The present invention provides a lithium-sulfur thermal battery including: a positive electrode including sulfur ($S_8$) or a sulfur compound, and a solid electrolyte including a lithium salt and a polymer having a melting point lower than a melting point of a negative electrode; a lithium metal negative electrode or lithium alloy; a solid electrolyte membrane disposed between the positive electrode and the negative electrode and including a lithium salt and a polymer having a melting point lower than a melting point of the lithium metal negative electrode or lithium alloy; and a heater configured to provide heat so that the polymer is melted.

15 Claims, 4 Drawing Sheets

(51) Int. Cl.
  *H01M 6/18* (2006.01)
  *H01M 4/40* (2006.01)
  *H01M 4/58* (2010.01)
  *H01M 4/136* (2010.01)
  *H01M 10/052* (2010.01)
  *H01M 10/655* (2014.01)
  *H01M 4/583* (2010.01)
  *H01M 10/0565* (2010.01)
  *H01M 4/02* (2006.01)

(52) U.S. Cl.
  CPC ........... *H01M 4/382* (2013.01); *H01M 4/405* (2013.01); *H01M 4/583* (2013.01); *H01M 4/5815* (2013.01); *H01M 6/181* (2013.01); *H01M 6/36* (2013.01); *H01M 10/0565* (2013.01); *H01M 10/655* (2015.04); *H01M 2004/027* (2013.01); *H01M 2004/028* (2013.01)

(58) Field of Classification Search
  CPC .......... H01M 4/38; H01M 4/583; H01M 6/36; H01M 2004/028; H01M 4/382; H01M 4/405; H01M 4/58; H01M 4/5815; H01M 4/587; H01M 6/18; H01M 6/181
  See application file for complete search history.

(56) References Cited

U.S. PATENT DOCUMENTS

2003/0211383 A1* 11/2003 Munshi ............... H01M 4/5835
  429/112
2006/0073376 A1* 4/2006 Munshi ............... H01M 4/5835
  429/112

FOREIGN PATENT DOCUMENTS

| KR | 10-1998-0025988 A | 7/1998 |
| KR | 10-2004-0013416 A | 2/2004 |
| KR | 10-2005-0038254 A | 4/2005 |
| KR | 10-2014-0007128 A | 1/2014 |
| KR | 10-1671664 B1 | 11/2016 |

OTHER PUBLICATIONS

Written Opinion of the International Searching Authority issued in PCT/KR2017/000953 dated Apr. 28, 2017 (4 pages).

* cited by examiner

[FIG. 1]
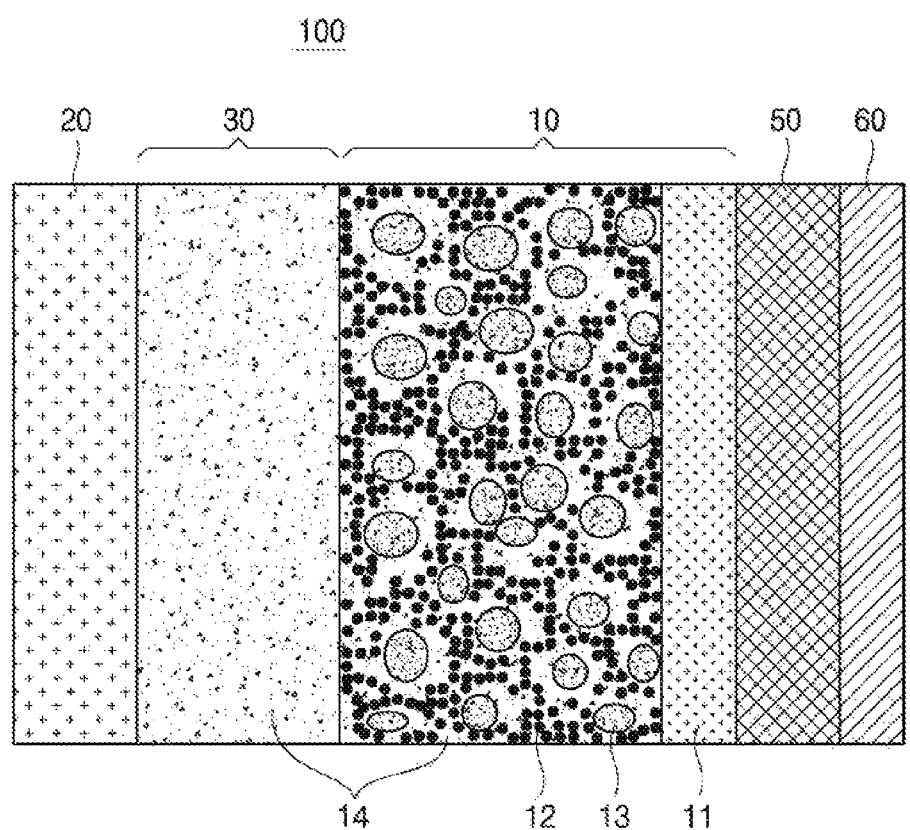

[FIG. 2]
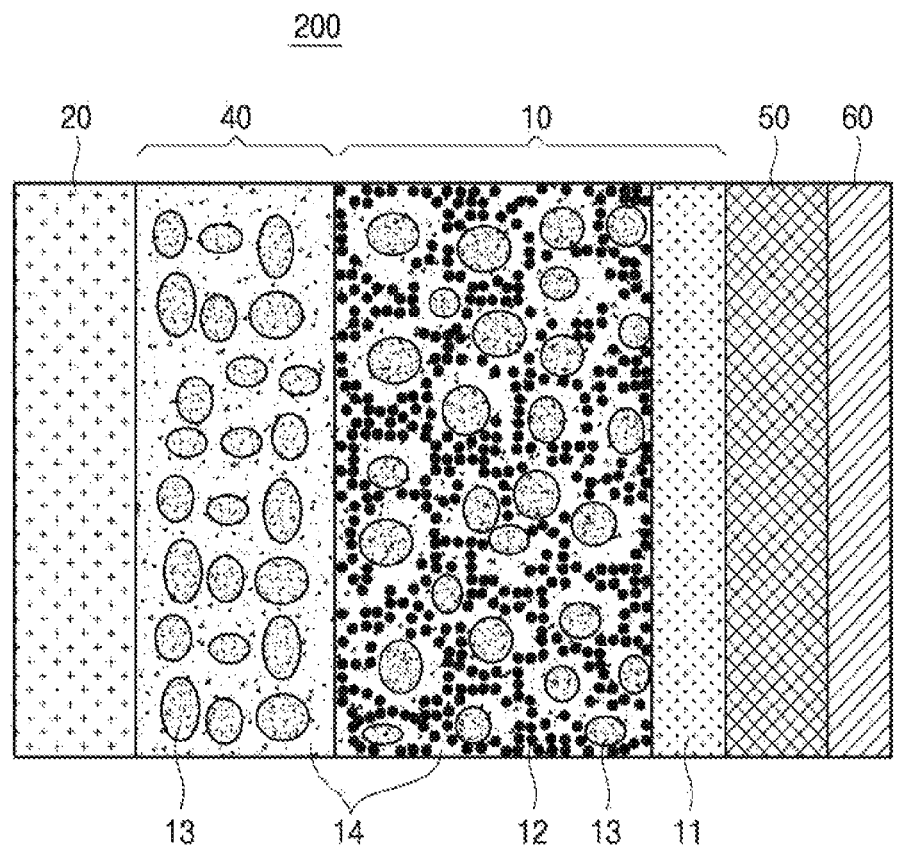
[FIG. 3]
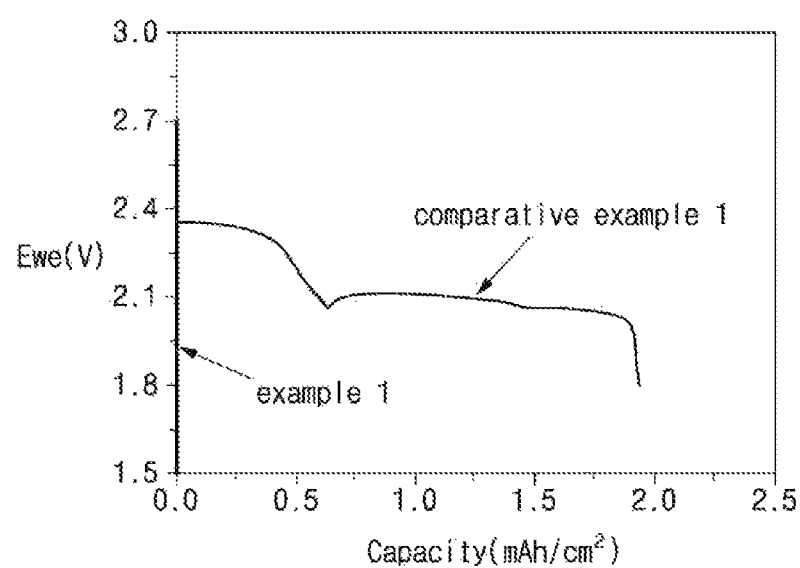

[FIG. 4]
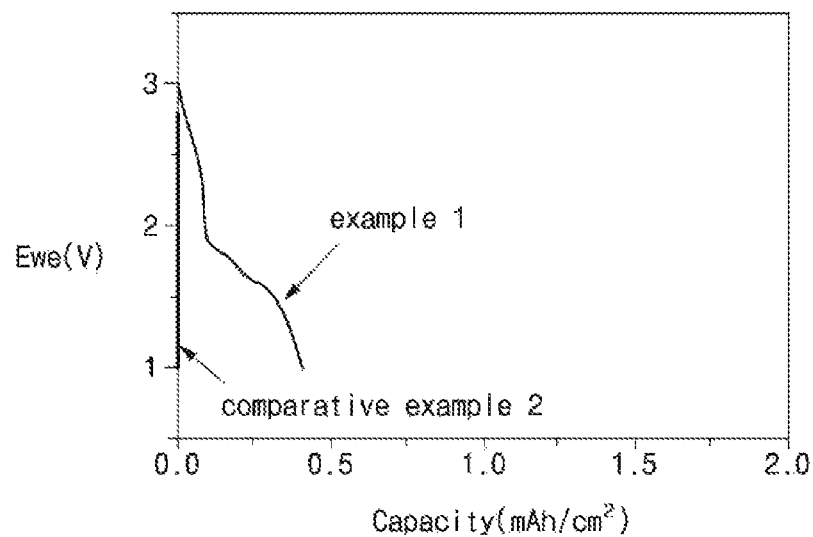
[FIG. 5]
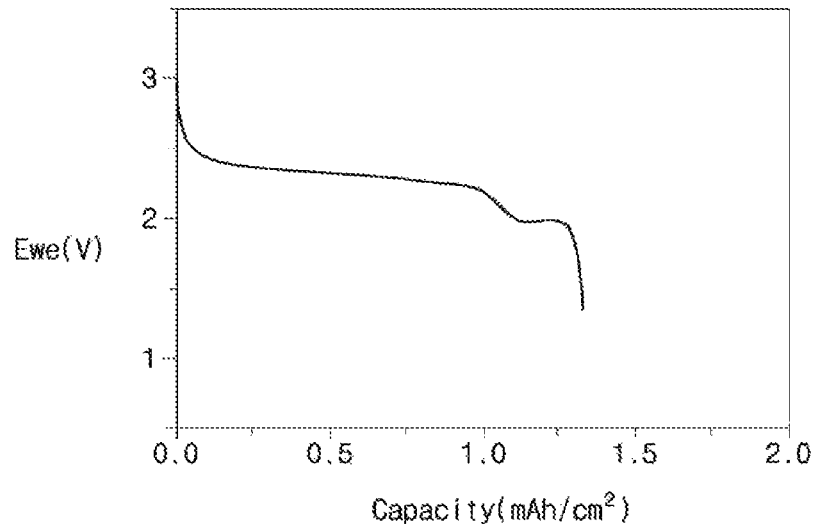

[FIG. 6]
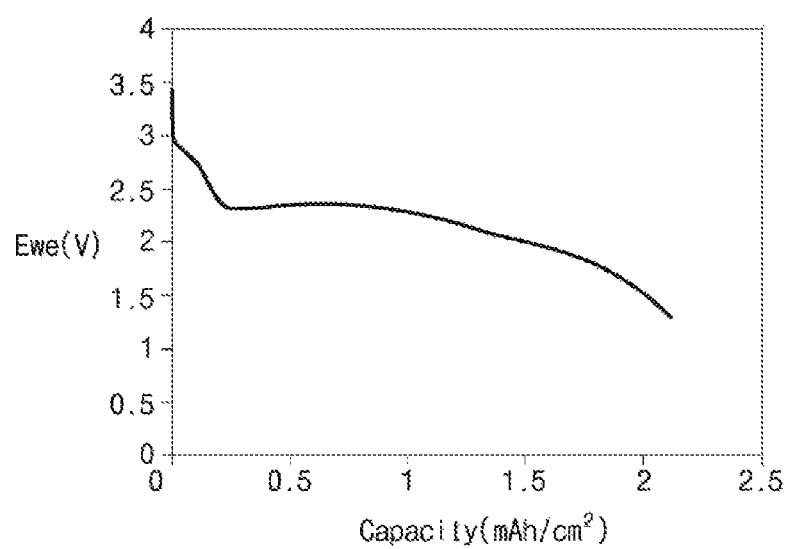

LITHIUM-SULFUR THERMAL BATTERY

TECHNICAL FIELD

The present invention relates to a lithium-sulfur thermal battery, and more particularly, to a lithium-sulfur thermal battery capable of operating at an intermediate and low temperature which is lower than an operating temperature of a conventional thermal battery and having a high output and high energy density.

BACKGROUND ART

A thermal battery is a thermally-activated primary reserve battery which has a solid state inorganic salt electrolyte having no ion conductivity between a negative electrode and a positive electrode at room temperature, and is activated by liquefying the electrolyte using heat of a heat generating material. Well-known thermal batteries are stored in a state in which the batteries are not activated at room temperature, and are activated upon receiving heat at a high temperature of 300° C. to 400° C. to perform a function of supplying power.

A thermal battery is advantageous in that long-term storage characteristics are excellent because the battery does not self-discharge even when stored for a long period of 10 years or more, reliability characteristics, such as being hardly affected by a vibration and impact, of the battery are excellent, and maintenance activities are unnecessary. Thermal batteries have been mainly used for military applications, such as power supplies of detonators for guided missiles, rockets, or the like, in which properties of a thermal battery can be effectively used.

Generally, a thermal battery has a structure in which a plurality of unit cells composed of a positive electrode, a negative electrode, a solid electrolyte, and a heating material are stacked, packaged with an insulator for blocking heat from the outside, and inserted into a case to be sealed, and is provided with an igniter configured to ignite the heating material of the unit cell and a connector for connection with an external device. Here, the positive electrode, the negative electrode, the solid electrolyte, and the heating material constituting the unit cell may each have a disk-shaped pellet form, and such elements in the pellet form may be sequentially stacked to form the unit cell. When the thermal battery needs to be operated, the heating material is activated or burned by the igniter to generate heat, and the heat causes liquefaction of the solid electrolyte to generate an electromotive force, thereby operating as a battery.

However, an operating temperature of a thermal battery is a very high temperature, and when the operating temperature is lowered, the molten solid electrolyte changes back to a solid and cannot perform a battery function, which is disadvantageous.

In well-known thermal batteries, a solid electrolyte uses a lithium eutectic salt such as LiCl—KCl, LiBr—KBr—LiF, LiCl—LiBr—LiF, LiCl—LiBr—KBr, or the like. However, since such a lithium eutectic salt has a melting point of 300° C. or higher, a conventional thermal battery requires a high operating temperature of 300° C. or higher (melting point or higher) for operation and a high-efficiency and high-cost insulating structure capable of maintaining a state of a melting point or higher so that a battery function can be maintained. This becomes a factor increasing the manufacturing cost of a thermal battery.

TECHNICAL PROBLEM

The present invention is directed to providing a lithium-sulfur thermal battery which has a polymer electrolyte membrane including a polymer and a lithium salt, and is capable of operating at an intermediate and low temperature.

In addition, the present invention is directed to providing a lithium-sulfur thermal battery in which an operating temperature thereof can be easily specified.

Technical Solution

A lithium-sulfur thermal battery according to an embodiment of the present invention includes: a positive electrode including sulfur ($S_8$) or a sulfur compound and a solid electrolyte including a lithium salt and a polymer having a melting point lower than a melting point of a lithium metal negative electrode; the lithium metal negative electrode or a lithium alloy negative electrode; a solid electrolyte membrane disposed between the positive electrode and the negative electrode and including a lithium salt and a polymer having a melting point lower than a melting point of the lithium metal negative electrode or lithium alloy negative electrode; and a heater configured to provide heat so that the polymer is melted.

A lithium-sulfur thermal battery according to another embodiment of the present invention includes: a positive electrode including sulfur ($S_8$) or a sulfur compound and a solid electrolyte including a lithium salt and a polymer having a melting point lower than a melting point of a negative electrode; a lithium metal negative electrode or lithium alloy negative electrode; a solid electrolyte membrane disposed between the positive electrode and the negative electrode and including sulfur or a sulfur compound, a polymer having a melting point lower than a melting point of the negative electrode, and a lithium salt; and a heater configured to provide heat so that the polymer is melted.

According to the embodiments of the present invention, the positive electrode may include a conductive material including a carbon-based material.

According to the lithium-sulfur thermal battery according to the embodiments of the present invention, the polymer may be a polymer having a melting point of 90° C. to 180° C.

According to the lithium-sulfur thermal battery according to the embodiments of the present invention, the polymer preferably includes at least one selected from the group consisting of an ether-based polymer, an ester-based polymer, an amide-based polymer, a carbonate-based polymer, an imide-based polymer, a vinyl alcohol-based polymer, a styrene-based polymer, a vinylidene fluoride-based polymer, an acrylate-based polymer, and a copolymer or mixture thereof.

According to the lithium-sulfur thermal battery according to the embodiments of the present invention, the polymer preferably includes at least one selected from the group consisting of polyethylene oxide, polypropylene oxide, polyaryletherketone, polydioxanone, polyetheretherketone, polyetherketoneketone, polyoxymethylene, polyphenylether, polytetrahydrofuran, polylactic acid, polycaprolactone, polyhydroxybutyrate, polybutylene succinate, polyparaphenylene terephthalamide, polycarbonate, polyacrylic acid, polyvinyl alcohol, polystyrene, polyethylene, polymethyl methacrylate, polyvinylidene fluoride-hexafluoropropylene (PVdF-HEP), polypropylene, and a copolymer or mixture thereof.

According to the lithium-sulfur thermal battery according to the embodiments of the present invention, the polymer further preferably includes at least one selected from the group consisting of polyethylene oxide, polypropylene oxide, polymethyl methacrylate, PVdF-HEP, and a copolymer or mixture thereof.

According to the lithium-sulfur thermal battery according to the embodiments of the present invention, the lithium salt may include at least one selected from the group consisting of LiCl, LiBr, LiI, LiPF$_6$, LiBF$_4$, LiSbF$_6$, LiAsF$_6$, LiClO$_4$, LiCF$_3$SO$_3$, LiC$_4$F$_9$SO$_3$ and LiN(SO$_2$CF$_3$)$_2$.

According to the lithium-sulfur thermal battery according to the embodiments of the present invention, the sulfur compound may include at least one selected from the group consisting of lithium sulfide, lithium polysulfide, and a carbon-sulfur complex.

According to the lithium-sulfur thermal battery according to the embodiments of the present invention, the heater may include a heating layer stacked on an outer side of the negative electrode or positive electrode, and the heating layer may include iron (Fe) and potassium perchlorate (KClO$_4$).

According to the lithium-sulfur thermal battery according to the embodiments of the present invention, an ignition layer to ignite may be further disposed on an outer side of the heating layer, and the ignition layer may include zirconium (Zr) and barium chromate (BaCrO$_4$).

According to the lithium-sulfur thermal battery according to the embodiments of the present invention, the lithium alloy negative electrode may be an alloy of lithium and at least one metal selected from aluminum, silicon, germanium, tin, lead, antimony, bismuth, and magnesium.

Advantageous Effects

A lithium-sulfur thermal battery according to an embodiment of the present invention can operate at an intermediate and low temperature, for example, 90° C. to 180° C., which is lower than an operating temperature of a conventional thermal battery at a high temperature of 300° C. or higher. Accordingly, a cost related to a heat insulating structure can be reduced and thus a manufacturing cost can be reduced because requirements for heat insulating performance is lower than that of a conventional thermal battery. Reduction in the manufacturing cost of the thermal battery can provide price competitiveness in not only military application fields in which thermal batteries are conventionally used but also in private application fields such as emergency power supplies or the like, and accordingly, there is an effect of increasing utilization fields of the thermal battery.

DESCRIPTION OF DRAWINGS

FIG. 1 is a schematic view of a lithium-sulfur thermal battery according to an embodiment of the present invention.

FIG. 2 is a schematic view of a lithium-sulfur thermal battery according to another embodiment of the present invention.

FIG. 3 is a graph showing battery characteristics of Example 1 and Comparative Example 1 measured at room temperature.

FIG. 4 is a graph showing battery characteristics of Example 1 and Comparative Example 2 measured at 110° C.

FIG. 5 is a graph showing battery characteristics of Example 2 measured at 110° C.

FIG. 6 is a graph showing battery characteristics of Example 3 measured at 130° C.

MODES OF THE INVENTION

Hereinafter, technical features of the present invention will be described in detail so that those skilled in the art can easily understand the present invention with reference to the accompanying drawings.

Terms or words used in the present specification and claims described below should not be construed as being limited to ordinary or dictionary meanings and should be construed as meanings and concepts consistent with the spirit of the present invention based on a principle that an inventor can appropriately define concepts of the terms to explain the present invention of the inventor in the best way. Therefore, since embodiments described in this specification and configurations illustrated in drawings are only exemplary embodiments and do not represent the overall technological scope of the present invention, it is understood that the present invention covers various equivalents, modifications, and substitutions at the time of filing of this application.

FIG. 1 is a schematic view of a lithium-sulfur thermal battery according to an embodiment of the present invention.

Referring to FIG. 1, a lithium-sulfur thermal battery 100 according to the embodiment of the present invention includes a positive electrode 10, a negative electrode 20, and a solid electrolyte membrane 30. Further, the lithium-sulfur thermal battery 100 may include a heating layer 50 and an ignition layer 60.

The positive electrode 10 includes a conductive material 12 and a solid electrolyte 14 including sulfur 13 or a sulfur compound as an active material and also including a polymer and a lithium salt.

The conductive material 12 may use a carbon-based material. For example, the conductive material 12 may use at least one selected from the group consisting of carbon black, carbon nanotube (CNT), carbon fiber, and graphite, but the present invention is not limited thereto.

The sulfur 13 may be cyclooctasulfur (S$_8$), which is the most stable form in nature. A chain-structured polysulfide anion (Sn$^{2-}$, n=2, 3, 4, 6, or 8) is produced while S—S covalent bonds of the cyclooctasulfur are broken in a discharge process of the lithium-sulfur thermal battery 100 and is finally reduced to lithium sulfide (Li$_2$S). An overall reaction is as follows:

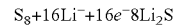

S$_8$+16Li$^+$+16$e^-$ 8Li$_2$S

Further, the sulfur compound may be at least one selected from the group consisting of lithium sulfide, lithium polysulfide, and a carbon-sulfur complex.

The solid electrolyte 14 includes a polymer and a lithium salt, and the polymer may be a polymer serving as a binder for adhering the conductive material 12 and the sulfur 13 or sulfur compound to a positive electrode current collector 11.

For example, the polymer may include at least one of an ether-based polymer, an ester-based polymer, an amide-based polymer, a carbonate-based polymer, an imide-based polymer, a vinyl alcohol-based polymer, a styrene-based polymer, a vinylidene fluoride-based polymer, an acrylate-based polymer, an alkylene-based polymer, or a copolymer or mixture thereof.

Preferably, the polymer may include at least one selected from the group consisting of polyethylene oxide, polypropylene oxide, polyaryletherketone, polydioxanone, polyetheretherketone, polyetherketoneketone, polyoxymethylene, polyphenylether, polytetrahydrofuran, polylactic acid, polycaprolactone, polyhydroxybutyrate, polybutylene succinate, polyparaphenylene terephthalamide, polycarbonate, polyacrylic acid, polyvinyl alcohol, polystyrene, polyethylene, polymethyl methacrylate, polyvinylidene fluoride-hexafluoropropylene (PVdF-HEP), polypropylene, and a copolymer mixture thereof.

More preferably, the polymer may include any one selected from the group consisting of polyethylene oxide, polypropylene oxide, polymethyl methacrylate, PVdF-HEP, and a copolymer and mixture thereof.

The polymer included in the positive electrode 10 may use a material different from a polymer used in the solid electrolyte membrane 30, but preferably uses the same material. According to the present invention, the polymer included in the positive electrode uses a polymer having a melting point lower than that of the negative electrode 20 of a lithium metal, and preferably has a melting point of 90° C. to 180° C.

The lithium salt constituting the solid electrolyte 14 included in the positive electrode 10 may include at least one selected from the group consisting of LiCl, LiBr, LiI, $LiPF_6$, $LiBF_4$, $LiSbF_6$, $LiAsF_6$, $LiClO_4$, $LiCF_3SO_3$, $LiC_4F_9SO_3$ and $LiN(SO_2CF_3)_2$, but the present invention is not necessarily limited thereto.

The lithium salt may use a material different from the lithium salt constituting the solid electrolyte membrane 30, but preferably uses the same material.

The positive electrode current collector 11 may be copper, aluminum, or stainless steel, surface-treated with carbon, nickel, titanium, silver, or the like, but the present invention is not limited thereto.

The negative electrode may use a lithium metal or a lithium alloy, and the lithium metal may be more preferable in terms of a manufacturing cost reduction.

When a lithium metal is used in the negative electrode 20, a protective film may be formed on a surface of the negative electrode 20 to prevent the solid electrolyte membrane 30 from bringing in contact with the lithium metal while passing lithium ions, in order that the problem of battery lifetime degradation due to dendrite precipitation on a surface of the lithium metal while charging and discharging are performed is solved.

Further, a lithium alloy may be used in the negative electrode, and here, the lithium alloy may be formed by alloying lithium and a metal such as aluminum, silicon, germanium, tin, lead, antimony, bismuth, or the like.

According to the present invention, the lithium-sulfur thermal battery 100 may have a high theoretical capacity and a high energy density by using the sulfur 13 or sulfur compound and the lithium metal, which are inexpensive and safe, as the positive electrode 10 and the negative electrode 20, respectively.

The solid electrolyte membrane 30 disposed between the positive electrode 10 and the negative electrode 20 includes a lithium salt and a polymer having a melting point lower than a melting point of the negative electrode 20. Preferably, the polymer may have a melting point of 90° C. to 180° C.

The thermal battery should not operate as a battery at a storage temperature such as room temperature, and thus the solid electrolyte membrane 30 should remain inactive at an operating temperature or below. According to the present invention, due to a polymer having a melting point of 90° C. or higher being selected as the polymer constituting the solid electrolyte membrane 30, the solid electrolyte membrane 30 may be maintained in an inactive state by maintaining a solid state at room temperature.

According to the present invention, the polymer is melted at an operating temperature or higher to dissolve the lithium salt so that the thermal battery functions as a battery, and thus, due to the solid electrolyte membrane 30 including the polymer and a lithium salt, an operating temperature of the thermal battery can be specified using a polymer having a melting point suitable for the operating temperature. Accordingly, although the thermal battery can be designed to operate at 90° C. or less according to the selection of a polymer, it is preferable to use a polymer having a melting point of 90° C. or higher to maintain stability in consideration of a temperature variation of a storage place, or the like.

Further, although the thermal battery can be designed to operate at 180° C. or higher according to the selection of a polymer, it is preferable to use a polymer having a melting point of 180° C. or less in consideration of an increase in heat insulation cost and the like. However, the present invention is not necessarily limited thereto.

The present invention makes it possible to provide a thermal battery having an operating temperature of an intermediate and low temperature (90° C. to 180° C.) rather than a high temperature of 300° C., which is an operating temperature of a conventional thermal battery, by using the solid electrolyte membrane 30 including the lithium salt and the lithium metal or the polymer having a melting point lower than a melting point of the lithium alloy.

Preferably, the polymer included in the solid electrolyte membrane 30 may be at least one of an ether-based polymer, an ester-based polymer, an amide-based polymer, a carbonate-based polymer, an imide-based polymer, a vinyl alcohol-based polymer, a styrene-based polymer, a vinylidene fluoride-based polymer, an acrylate-based polymer, an alkylene-based polymer, a copolymer or mixture thereof, more preferably, the polymer may be at least one selected from the group consisting of polyethylene oxide, polypropylene oxide, polyaryletherketone, polydioxanone, polyetheretherketone, polyetherketoneketone, polyoxymethylene, polyphenylether, polytetrahydrofuran, polylactic acid, polycaprolactone, polyhydroxybutyrate, polybutylene succinate, polyparaphenylene terephthalamide, polycarbonate, polyacrylic acid, polyvinyl alcohol, polystyrene, polyethylene, polymethyl methacrylate, PVdF-HEP, polypropylene, and a copolymer mixture thereof.

More preferably, the polymer may include any one selected from the group consisting of polyethylene oxide, polypropylene oxide, polymethyl methacrylate, PVdF-HEP, and a copolymer and mixture thereof. Above described polymers have a relatively lower melting point than other polymers at the same molecular weight, such that it is more advantageous to design the thermal battery to operate at an intermediate and low temperature.

The lithium salt included in the solid electrolyte membrane 30 may use a material which will be dissolved when the selected polymer is melted and liquefied, and preferably, the lithium salt may include at least one selected from the group consisting of LiCl, LiBr, LiI, $LiPF_6$, $LiBF_4$, $LiSbF_6$, $LiAsF_6$, $LiClO_4$, $LiCF_3SO_3$, $LiC_4F_9SO_3$, and $LiN(SO_2CF_3)_2$.

The heating layer 50 functions to provide heat to the positive electrode 10 and the solid electrolyte membrane 30 so that the positive electrode 10 and the solid electrolyte membrane 30 are polymer-melted. The heating layer 50 may be disposed on any one outer side of the positive electrode 10 and the negative electrode 20. However, the thermal battery according to the present invention is not limited to a form in which the heating layer 50 is disposed inside a unit cell as in the embodiment, but may be configured such that heat is provided from the outside.

The heating layer 50 may be formed by mixing iron (Fe) and potassium perchlorate (KClO$_4$) at a predetermined ratio, melting the mixture to form a fine powder, and molding the fine powder into a thin plate. Each of the positive electrode 10, the negative electrode 20, the solid electrolyte membrane 30, the heating layer 50, and the like may be formed to have a disk shape by a press or the like, and stacked in series or parallel to form a unit cell.

The ignition layer 60 may be provided on an outer side of the heating layer 50 to ignite the heating layer 50. The ignition layer 60 is also referred to as a heat paper, and may be formed by mixing zirconium (Zr) and barium chromate (BaCrO$_4$) in a predetermined ratio, melting the mixture to form a fine powder, and then molding the fine powder into a thin plate. The ignition layer may be ignited by a light spark generated in a detonator, and then the heating layer may be ignited by a part such as a fuse or the like.

An insulator is used to keep the temperature inside the thermal battery constant by wrapping components of the thermal battery. For example, it may be possible to prevent heat from leaking to the outside of the thermal battery or to block external heat from being introduced into the thermal battery by packaging the thermal battery by wrapping the insulator along an outer surface of each component of the thermal battery. However, the packaging method of the insulator is not necessarily limited thereto. The insulator allows the temperature inside the thermal battery to be maintained at a temperature higher than the operating temperature of the thermal battery, that is, a melting point of the polymer. Here, since the thermal battery according to the present invention does not need to maintain a high temperature of 300 or higher like a conventional thermal battery, a simpler and less expensive material than that of a conventional thermal battery may be used.

FIG. 2 is a schematic view of a lithium-sulfur thermal battery according to another embodiment of the present invention.

Referring to FIG. 2, a lithium-sulfur thermal battery 200 according to another embodiment of the present invention includes sulfur 13 or a sulfur compound in a solid electrolyte membrane 40, in contrast to the lithium-sulfur thermal battery 100 according to the embodiment of the present invention.

According to the research of the present inventor, sulfur and lithium sulfide particles electrically separated from a positive electrode may also participate in a reaction. That is, a charge transfer occurs at a solid-liquid interface rather than at a solid-solid interface in a lithium-sulfur battery. In a conventional lithium-sulfur thermal battery which includes sulfur or a sulfur compound only in a positive electrode, an amount of the sulfur that can be supported by an area of the positive electrode is limited. However, according to another embodiment of the present invention, an amount of the sulfur 13 or sulfur compound in the lithium-sulfur thermal battery 200 may be increased by adding the sulfur 13 or the sulfur compound to the solid electrolyte membrane 40, and accordingly, capacity characteristics of the thermal battery may be improved.

In the lithium-sulfur thermal battery 200 according to another embodiment of the present invention described with reference to FIG. 2, a positive electrode 10, a negative electrode 20, a heating layer 50, and an ignition layer 60 are identical to those of the lithium-sulfur thermal battery 100 described with reference to FIG. 1, except that the sulfur or sulfur compound is included in the solid electrolyte membrane 30.

Hereinafter, the present invention will be described in more detail based on preparation examples and experimental examples of a lithium-sulfur battery according to embodiments of the present invention. However, the preparation examples and experimental examples are provided for the purpose of describing the present invention and should not be understood as limiting the scope of the present invention.

EXAMPLE 1

(Preparation of Solid Electrolyte Membrane)

10.0 g of polyethylene oxide (Aldrich Co., Mw 100,000) and 1.5 g of LiPF$_6$ were mixed and dissolved in an appropriate amount of acetonitrile (CH$_3$CN) to prepare a high viscosity solution. A glass plate was coated with the solution to have a coating thickness of 50 μm using a doctor blade, and dried in an oven at 60° C. to form a solid electrolyte membrane. Polyethylene oxide having a melting point of approximately 98° C. was used.

(Preparation of Positive Electrode)

58 wt % of sulfur powder (S$_8$) as a positive electrode active material, 19 wt % of polyethylene oxide as a binder, 19 wt % of Ketjen black (KB600, Akzo Nobel, Japan EC 600 JD) as a conductive material, and 4 wt % of LiPF$_6$ were mixed, and the mixture was dispersed in an acetonitrile solvent for 12 hours or longer to prepare a positive electrode slurry. A carbon-coated aluminum foil was coated with the prepared slurry and then dried and rolled to form a positive electrode. A loading amount of the sulfur in the positive electrode was about 3.4 mg per unit area (cm$^2$). As the polyethylene oxide, polyethylene oxide identical to that constituting the solid electrolyte membrane was used.

(Preparation of Battery including Solid Electrolyte Membrane)

A battery composed of the solid electrolyte membrane, the positive electrode, and a lithium metal negative electrode was assembled in a glove box filled with argon.

EXAMPLE 2

(Preparation of Solid Electrolyte Membrane)

3.0 g of polyethylene oxide (Aldrich Co., Mw 100,000) and 1.0 g of LiPF$_6$ were mixed and dissolved in an appropriate amount of acetonitrile solvent, then, 7.0 g of sulfur was added to uniformly disperse the sulfur, and a glass plate was coated with the mixed solution using a doctor blade, and then dried in an oven at 40° C. to form a solid electrolyte membrane (thickness=80 μm). A loading amount of the sulfur present in the solid electrolyte membrane was about 4.5 mg per unit area (cm$^2$).

(Preparation of Positive Electrode)

58 wt % of sulfur powder (S$_8$) as a positive electrode active material, 19 wt % of polyethylene oxide as a binder, 19 wt % of Ketjen black (KB600, Akzo Nobel, Japan EC 600 JD) as a conductive material, and 4 wt % of LiPF$_6$ were mixed, and the mixture was dispersed in an acetonitrile solvent for 12 hours or longer to prepare a positive electrode slurry. A carbon-coated aluminum foil was coated with the prepared slurry and then dried and rolled to form a positive electrode. A loading amount of the sulfur in the positive electrode was about 3.4 mg per unit area (cm$^2$).

(Preparation of Battery including Solid Electrolyte Membrane)

A battery composed of the solid electrolyte membrane, the positive electrode, and a lithium metal negative electrode was assembled in a glove box filled with argon. As a result, a loading amount of the sulfur in the battery was about 7.9 mg per unit area (cm$^2$).

EXAMPLE 3

(Preparation of Solid Electrolyte Membrane)

3.0 g of polyethylene oxide (Aldrich, Mw 100,000), 1.0 g of LiPF$_6$, and 7.0 g of sulfur were uniformly dispersed in a solid state using a ball milling method to prepare a disk-shaped pellet (thickness=80 μm). A loading amount of the sulfur present in the solid electrolyte membrane was about 4.5 mg per unit area (cm$^2$).

(Preparation of Positive Electrode)

58 wt % of sulfur powder (S$_8$) as a positive electrode active material, 19 wt % of polyethylene oxide as a binder, 19 wt % of Ketjen black (KB600, Akzo Nobel, Japan EC 600 JD) as a conductive material, and 4 wt % of LiPF$_6$ were mixed, and the mixture was dispersed in an acetonitrile solvent for 12 hours or longer to prepare a positive electrode slurry.

A carbon-coated aluminum foil was coated with the prepared slurry and then dried and rolled to form a positive electrode. A loading amount of the sulfur in the positive electrode was about 3.4 mg per unit area (cm$^2$).

(Preparation of Battery including Solid Electrolyte Membrane)

A battery composed of the solid electrolyte membrane, the positive electrode, and a lithium metal negative electrode was assembled in a glove box filled with argon. As a result, a loading amount of the sulfur in the battery was about 7.9 mg per unit area (cm$^2$).

COMPARATIVE EXAMPLE 1

A battery was manufactured in the same manner as in Example 1, except that a separator and a liquid electrolyte including a lithium salt and a mixed solution of dimethoxyethane/diglyme/1,3-dioxolane (volume ratio, 6/2/2) in which LiN(SO$_2$CF$_3$)$_2$ was dissolved in a concentration of 1 mol were used instead of the solid electrolyte membrane of Example 1.

COMPARATIVE EXAMPLE 2

A battery was manufactured in the same manner as in Example 1, except that a solid electrolyte membrane prepared using a high pressure press and composed of a LiCl—KCl eutectic salt (50 wt %) and MgO (50 wt %) was used instead of the solid electrolyte membrane of Example 1.

EVALUATION EXAMPLE 1

Example 1 and Comparative Example 1 were discharged to 1.8 V at a constant current (rate of 0.1 C) at room temperature. Each of the measurement results is shown in FIG. 3. As shown in FIG. 3, Example 1 did not work at room temperature. On the other hand, Comparative Example 1 using the liquid electrolyte operated normally.

EVALUATION EXAMPLE 2

It was replicated that a thermal battery including a heater was operated by heat generated in the thermal battery by evaluating battery characteristics of Example 1, Example 2, and Comparative Example 2 in an oven at 110° C. Example 1, Example 2 and Comparative Example 2 were discharged to 1.0 V with a constant current (rate of 0.1 C). The measurement results of Example 1 and Comparative Example 2 are shown in FIG. 4. Referring to FIG. 4, Comparative Example 2 did not operate at all at 110° C., but the battery of Example 1 operated. The measurement results of Example 2 are shown in FIG. 5. Referring to FIG. 5, a capacity of the battery of Example 2 using the sulfur-supported solid electrolyte membrane was greatly improved.

Through the Evaluation Examples 1 and 2, it can be seen that the lithium-sulfur thermal batteries 100 and 200 according to the embodiment of the present invention do not operate as a battery at room temperature, but operate at an intermediate temperature of 110° C., and in particular, it can be seen that a capacity of the lithium-sulfur thermal batteries 100 and 200 may be greatly improved when sulfur is supported on the solid electrolyte membrane.

EVALUATION EXAMPLE 3

It was replicated that a thermal battery including a heater was operated by heat generated in the thermal battery by evaluating battery characteristics of Example 3 in an oven at 110° C. Example 3 was discharged to 1.0 V with a constant current (0.5 mA/cm$^2$). The measurement results of Example 3 are shown in FIG. 6. Referring to FIGS. 5 and 6, it can be seen battery characteristics are greatly improved at a higher temperature of 130° C.

The present invention is not limited to the above-described embodiments and the accompanying drawings, but is intended to be limited only by the appended claims. Therefore, it should be understood that various changes, replacements, alterations, and modifications can be made by those skilled in the art without departing from the spirit and scope of the present invention as defined in the appended claims, and this also falls within the scope of the present invention.

The invention claimed is:

1. A lithium-sulfur thermal battery comprising:
    a positive electrode including sulfur (S$_8$) or a sulfur compound and a solid electrolyte including a lithium salt and a polymer having a melting point lower than a melting point of a negative electrode;
    wherein the negative electrode is a lithium metal negative electrode or a lithium alloy negative electrode;
    a solid electrolyte membrane disposed between the positive electrode and the negative electrode and including a lithium salt and a polymer having a melting point lower than a melting point of the lithium metal negative electrode or the lithium alloy negative electrode; and
    a heater configured to provide heat so that the polymer is melted.

2. The lithium-sulfur thermal battery of claim 1, wherein the solid electrolyte membrane further includes:
    sulfur (S$_8$) or a sulfur compound.

3. The lithium-sulfur thermal battery of claim 1, wherein the positive electrode comprises a conductive material including a carbon-based material.

4. The lithium-sulfur thermal battery of claim 1, wherein a melting point of the polymer is in a range of 90° C. to 180° C.

5. The lithium-sulfur thermal battery of claim 4, wherein the polymer comprises at least one selected from the group consisting of an ether-based polymer, an ester-based polymer, an amide-based polymer, a carbonate-based polymer, an imide-based polymer, a vinyl alcohol-based polymer, a styrene-based polymer, a vinylidene fluoride-based polymer, an acrylate-based polymer, and a copolymer or mixture thereof.

6. The lithium-sulfur thermal battery of claim 4, wherein the polymer comprises at least one selected from the group consisting of polyethylene oxide, polypropylene oxide, polyaryletherketone, polydioxanone, polyetheretherketone, polyetherketoneketone, polyoxymethylene, polyphenylether, polytetrahydrofuran, polylactic acid, polycaprolactone, polyhydroxybutyrate, polybutylene succinate, polyparaphenylene terephthalamide, polycarbonate, polyacrylic acid, polyvinyl alcohol, polystyrene, polyethylene, polymethyl methacrylate, polyvinylidene fluoride-hexafluoropropylene (PVdF-HEP), polypropylene, and a copolymer or mixture thereof.

7. The lithium-sulfur thermal battery of claim 5, wherein the polymer comprises at least one selected from the group consisting of polyethylene oxide, polypropylene oxide, polymethyl methacrylate, polyvinylidene fluoride-hexafluoropropylene (PVdF-HEP), and a copolymer or mixture thereof.

8. The lithium-sulfur thermal battery of claim 1, wherein the lithium salt comprises at least one selected from the group consisting of LiCl, LiBr, LiI, $LiPF_6$, $LiBF_4$, $LiSbF_6$, $LiAsF_6$, $LiClO_4$, $LiCF_3SO_3$, $LiC_4F_9SO_3$ and $LiN(SO_2CF_3)_2$.

9. The lithium-sulfur thermal battery of claim 1, wherein the sulfur compound is at least one selected from the group consisting of lithium sulfide, lithium polysulfide, and a carbon-sulfur complex.

10. The lithium-sulfur thermal battery of claim 1, wherein the heater comprises a heating layer stacked on an outer side of the negative electrode or the positive electrode, and the heating layer includes iron (Fe) and potassium perchlorate ($KClO_4$).

11. The lithium-sulfur thermal battery of claim 10, further comprising an ignition layer configured to ignite the heating layer.

12. The lithium-sulfur thermal battery of claim 11, wherein the ignition layer comprises zirconium (Zr) and barium chromate ($BaCrO_4$).

13. The lithium-sulfur thermal battery of claim 1, wherein the polymer included in the positive electrode and the polymer included in the solid electrolyte membrane are identical.

14. The lithium-sulfur thermal battery of claim 13, wherein the lithium salt included in the positive electrode and the lithium salt included in the solid electrolyte membrane are identical.

15. The lithium-sulfur thermal battery of claim 1, wherein the lithium alloy negative electrode is an alloy of lithium and at least one metal selected from aluminum, silicon, germanium, tin, lead, antimony, bismuth, and magnesium.

* * * * *